(12) United States Patent
Odendall

(10) Patent No.: US 8,794,214 B2
(45) Date of Patent: Aug. 5, 2014

(54) METHOD FOR OPERATING AN INTERNAL COMBUSTION ENGINE OF A MOTOR VEHICLE

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 769 days.

(21) Appl. No.: 12/955,131

(22) Filed: Nov. 29, 2010

(65) Prior Publication Data

US 2011/0138778 A1    Jun. 16, 2011

(30) Foreign Application Priority Data

Nov. 27, 2009   (DE) .......................... 10 2009 056 026

(51) Int. Cl.
*F02M 1/00* (2006.01)

(52) U.S. Cl.
USPC ........................ 123/445; 123/198 A; 123/470

(58) Field of Classification Search
USPC .............................. 123/198 A, 445, 440, 299
See application file for complete search history.

(56) References Cited

U.S. PATENT DOCUMENTS

| | | | |
|---|---|---|---|
| 6,745,743 B2 * | 6/2004 | Abo et al. ...................... | 123/295 |
| 6,971,364 B2 * | 12/2005 | Pilgram et al. ................ | 123/299 |
| 7,185,488 B2 * | 3/2007 | Otsubo et al. .................. | 60/295 |
| 7,357,122 B2 * | 4/2008 | Basaki et al. ................. | 123/478 |
| 2006/0266323 A1 * | 11/2006 | Ogimura .................... | 123/198 A |
| 2010/0070158 A1 * | 3/2010 | Futonagane et al. .......... | 701/105 |

* cited by examiner

*Primary Examiner* — John Kwon
(74) *Attorney, Agent, or Firm* — Novak Druce Connolly Bove + Quigg LLP

(57) ABSTRACT

The invention relates to a method that is intended for operating an internal combustion engine of a motor vehicle and that flushes the temporarily unused injection valves with fuel for the purpose of preventing and/or removing deposits. In order to make possible in a simple way a complete conversion of the undesired exhaust gas constituents in a catalytic converter of an exhaust gas aftertreatment system of the internal combustion engine when the internal combustion engine is running, the invention proposes flushing the temporarily unused injection valves with fuel during an overrun mode of the internal combustion engine.

8 Claims, 1 Drawing Sheet

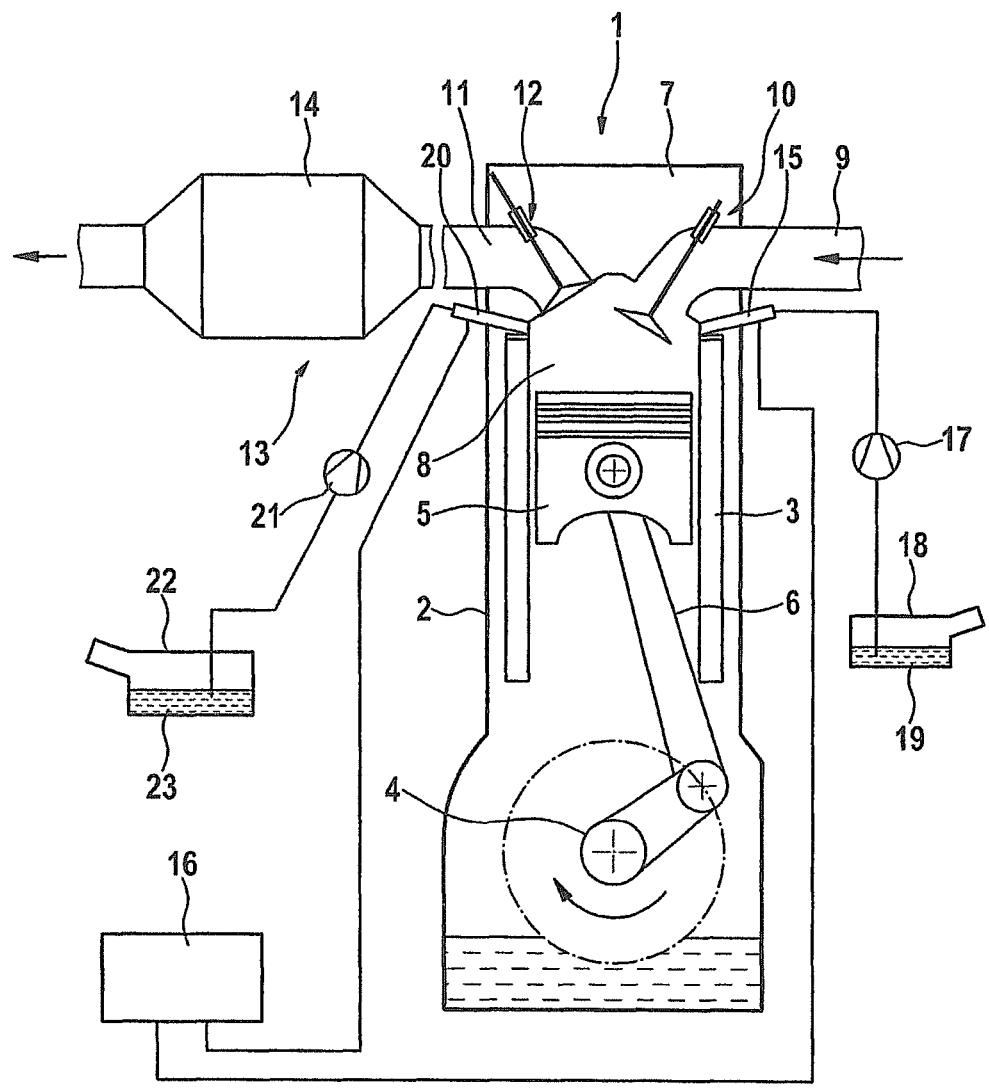

METHOD FOR OPERATING AN INTERNAL COMBUSTION ENGINE OF A MOTOR VEHICLE

The invention relates to a method that is intended for operating an internal combustion engine of a motor vehicle and that flushes the temporarily unused injection valves with fuel for the purpose of preventing and/or removing deposits.

BACKGROUND OF THE INVENTION

In some internal combustion engines having a plurality of injection valves, it may occur that some of the injection valves are used only relatively infrequently. This is, for example, the case with internal combustion engines that are operated with a variety of fuels, of which one is injected only in a few engine operating states, or in the case of so-called dual fuel injection internal combustion engines that have both injection valves for an intake manifold injection and also injection valves for a direct injection, where some of these injection valves are used only from time to time as a function of the operation.

However, injection valves which are used only at longer time intervals may develop deposits, for example, due to the evaporation of the fuel as a consequence of the waste heat of the internal combustion engine and due to gum formation of the remaining fuel constituents or due to the combustion products generated downstream of the injection valves. Such deposits may lead not only to an impaired operation because of the change in the amounts of injected fuel, but can also result in damage to the injection valves under unfavorable circumstances. Such damage would make it necessary to replace said injection valves. In order to remove the deposits, it is necessary to flush from time to time the infrequently used injection valves with fuel.

DE 10 2008 031 830 A1 has already disclosed a method of the aforementioned kind for operating internal combustion engines, which use a plurality of fuel types and deliver these types of fuel through the various injection valves into the combustion chambers of the cylinders. In order to prevent that under predefined conditions, for example, when one of the injection valves is not constantly injected with fuel or another substance, the subsequent operation of the injection valve is adversely affected due to the soiling of the injection valves with carbon black or other combustion products, this prior art document proposes delivering a first fuel into the cylinders by means of a first injection valve and injecting, at a first engine power output, a second fuel directly into the cylinder by means of a second injection valve, whereas at a second engine power output that is lower than the first engine power output, instead of the second fuel, a flushing substance is injected directly into the cylinder by means of the second injection valve, wherein this flushing substance can comprise the first and/or the second fuel.

If fuel is used to flush the temporarily unused injection valves, the result is, however, a change in the composition of the exhaust gas downstream of the internal combustion engine, because the fuel that is used for the flushing operation causes a decrease in the air-to-fuel ratio in the exhaust gas. This state in turn has a negative impact on the chemical conversion of undesired exhaust gas constituents like hydrocarbons (HC), carbon monoxide (CO), and nitrogen oxides ($NO_x$) in a catalytic converter disposed in the exhaust gas system downstream of the internal combustion engine, because, at least in the case of three-way catalytic converters, an optimal conversion rate in the exhaust gas mandates a constant air-to-fuel mixture in a stoichiometric ratio ($\lambda=1$). In principle, it would be conceivable to consider the amount of fuel used for flushing during the pilot control operation of the fuel to air mixture delivered into the cylinder. However, such an approach is very complicated, because, on the one hand, the amount of fuel that is delivered into the injection valves when one or more injection valves are occasionally flushed, can be calculated only with difficulty, for example, because of the formation of carbon black or vapor bubbles in the said injection valves; and, on the other hand, because the computing algorithms that are used in the engine control unit have to be supplemented with additional computing algorithms in order to consider, in the course of the mixture pilot control operation, the amount of additional fuel that is used for flushing as a function of the type of fuel used for flushing and/or as a function of the operating states of the internal combustion engine.

Working on this basis, the object of the invention is to improve a method of the aforementioned kind so that even if the amount of fuel used for flushing is not considered during the mixture pilot control operation, a complete conversion of the undesired exhaust gas constituents in a catalytic converter of an exhaust gas aftertreatment system of the internal combustion engine when the internal combustion engine is running is still guaranteed.

SUMMARY OF THE INVENTION

The invention achieves this object in that the temporarily unused injection valves are flushed with fuel during an overrun mode of the internal combustion engine.

Within the scope of the present patent invention, fuel is defined as any combustible substance that is suitable for flushing the injection valves of internal combustion engines of motor vehicles and/or that is used for this purpose. Furthermore, overrun mode is defined as a running state of the vehicle, in which the internal combustion engine is dragged by the vehicle, and, in so doing, the crankshaft is set into and/or held in rotational motion.

The invention is based on the idea that when the internal combustion engine in modern vehicles is in overrun mode, the fuel supply is generally interrupted by cutting off the overrun fuel, so that, apart from the fuel that is used for flushing, the catalytic converter is supplied only with ambient air, which is usually referred to as the overrun air during the overrun mode and which has an oxygen content of about 21%, but no additional fuel is supplied. Since only a very small amount of fuel, which amounts to just a few milligrams per injection valve according to one advantageous embodiment of the invention, is required for flushing the temporarily unused injection valves, this small amount of unburned fuel can be introduced, according to an additional preferred embodiment of the invention, into the catalytic converter with the oxygen contained in the overrun air, for the purpose of reaction and then totally converted into carbon dioxide ($CO_2$) and water ($H_2O$). Since the internal combustion engine in overrun mode is not fired—that is, no fuel is burned in the combustion chambers of the cylinders—neither carbon monoxide nor nitrogen oxides are generated during the overrun mode, so that the conversion of the fuel, which is used for flushing the valves, with the oxygen in the overrun air is adequate enough to satisfy even the most stringent legal requirements for the exhaust gas emissions in the internal combustion engine.

In order to prevent the catalytic converter from overheating due to the exothermic reaction of the fuel, which is used for flushing the valves, with the oxygen from the overrun air, another preferred embodiment of the invention provides that the ratio between the amount of fuel which is used for flushing the valves and the amount of overrun air, which is delivered to the internal combustion engine during the flushing operation, is adjusted in such a way that during the flushing operation the result is an over-stoichiometric air-to-fuel ratio downstream of the internal combustion engine in the exhaust gas system. In this case, a very lean mixture having a high oxygen content and a low fuel content is preferred; and the air-to-fuel ratio exhibits a value of $\lambda>3$ and, preferably, a value of $\lambda>4$.

This adjustment can be performed expediently by suitably controlling the overrun air supply and/or by suitably controlling the fuel delivery rate during the flushing operation, that is, the amount of air and/or fuel that is delivered per unit of time into the injection valve(s) to be flushed.

In the event that during an overrun mode a plurality of injection valves are to be flushed, then the air-to-fuel ratio in the exhaust gas can also be influenced by delivering fuel for the flushing operation in succession, or overlapping one another or simultaneously to the injection valves to be flushed.

The invention is explained in detail below in conjunction with one embodiment that is depicted in the drawing.

BRIEF DESCRIPTION OF THE DRAWINGS

FIG. 1 shows a schematic drawing of an internal combustion engine with a variety of injection valves for two different types of fuel.

DETAILED DESCRIPTION OF THE PREFERRED EMBODIMENTS OF THE INVENTION

The internal combustion engine 1, which is shown in FIG. 1 and is a part of a motor vehicle, comprises a cylinder crankcase 2 with a plurality of cylinders 3 (of which only one is shown), a crankshaft 4, and several pistons 5 (of which only one is shown), which are connected to the crankshaft 4 by means of connecting rods 6 and which move up and down in one of the cylinders 3. In this case, the pistons together with the cylinders 3 and a cylinder head 7 of the internal combustion engine 1 define the combustion chambers 8. The crankshaft 4 drives the wheels of the motor vehicle by means of a drive train (not illustrated).

The cylinder head 7 is provided with inlet channels 9 and inlet valves 10, through which fresh air is delivered into the combustion chambers 8 of the cylinders 3. Furthermore, the cylinder head 7 is provided with outlet channels 11 and outlet valves 12 through which the exhaust gases from the combustion chambers 8 of the cylinders 3 are drawn off into an exhaust gas system 13 of the internal combustion engine 1. In order to reduce the exhaust gas emissions of the internal combustion engine 1, the exhaust gas system 13 has a three-way catalytic converter 14.

Furthermore, the internal combustion engine 1 has a plurality of first injection valves 15 (of which only one is illustrated), through which a first fuel can be injected directly into the combustion chambers 8 of the cylinders 3. For this purpose, the first injection valves, which are mounted in the cylinder head 7 of the internal combustion engine 1 and which are controlled by a valve control unit 16, are connected by way of a fuel pump 17 to a first fuel tank 18 in order to accommodate the first fuel 19.

Furthermore, the internal combustion engine 1 has a plurality of second injection valves 20, through which a second fuel 20 can be injected, as an alternative or in addition to the first fuel 19, into the combustion chambers 8 of the cylinders 3. For this purpose, the injection valves 20, which are mounted in the cylinder head 7 and are also controlled by the valve control unit 16, are connected by way of a fuel pump 21 to a second fuel tank 22 in order to accommodate the second fuel 23.

Since the internal combustion engine 1 is operated with the first and/or second fuel 19 or 23, respectively, as a function of the respective operating state, the situation may arise that the two fuels 19, 23 are used on a totally different scale. If, for example, after each startup the internal combustion engine 1 is operated exclusively with the fuel 19 for a certain length of time initially, then the other fuel 23 is used only infrequently when the engine is operated with many short trips. Accordingly, this state in turn may develop into the situation that on operating the internal combustion engine 1 with the other fuel 23, the residual fuel, which has remained in the injection valves 20, eventually evaporates because of the waste heat of the internal combustion engine 1, so that over time highly viscous or resinous residues can settle out in the injection valves 20.

In order to avoid that such residues can adversely affect the metering of the second fuel 23, which is injected by the injection valves 20 or can even lead to damage of the injection valves 20 necessitating their replacement, the injection valves 20 are flushed from time to time with fuel.

Owing to the flushing of the injection valves 20, an additional amount of fuel 23 passes into the combustion chambers 8 of the cylinders 3. However, this quantity of fuel can be considered only with difficulty during the mixture pilot control operation, because, on the one hand, flushing is performed at greater time intervals only; and, on the other hand, usually only very little fuel 23 is used for flushing.

In order to avoid, nevertheless, a variation in the exhaust gas composition and, as a result of this variation, an impairment of the exhaust gas conversion in the three-way catalytic converter 14, the flushing of the second injection valves 20 is performed only in overrun mode of the internal combustion engine 1, when said latter is driven via the drive train by the wheels of the motor vehicle, for example, when traveling downhill or when decelerating the motor vehicle by means of the internal combustion engine 1.

In this operating mode, on the one hand, the internal combustion engine 1 is not fired and the fuel supply to the first and second injection valves 15, 20 is interrupted, except for the delivery of the small amount of fuel of a few milligrams that is used for flushing, whereas, on the other hand, when the inlet valves 10 are open, the movement of the pistons 5 causes the overrun air—that is, the ambient air—to be drawn through the inlet channels 9 into the combustion chambers 8 of the cylinders 3; and when the outlet valves 12 are open, the overrun air, exhibiting a composition that is essentially unchanged, is discharged again through the outlet channels 11 into the exhaust gas system 13.

The result is that the fuel 23 that is used in overrun mode to flush the injection valves 20 mixes with the overrun air in the combustion chambers 8 of the cylinders 3, and because the internal combustion engine 1 is not fired, flows together with the overrun air through the exhaust gas system 13 to the catalytic converter 14, where it is completely converted to carbon dioxide and water owing to the high oxygen content of the overrun air.

In order to avoid damage of the catalytic converter 14 due to overheating as a consequence of the exothermic reaction of the fuel 23 and the atmospheric oxygen, the delivery rates of the fuel 23, serving to flush the injection valves 20, and the overrun air are adapted to each other in such a way that the result is an air-to-fuel ratio having a value of $\lambda>4$ in the exhaust gas system 13 upstream of the catalytic converter 14.

As a consequence of the relatively high air delivery rate at such an air-to-fuel ratio, there is a decrease in the amount of heat that is released during the reaction of the fuel 23 and the atmospheric oxygen per unit of time, and, thus, there is also a drop in the temperature increase induced by this amount of heat, at the catalytic converter 14. Therefore, at an overrun air temperature of about 200° C. in the outlet channel 11 and a temperature increase of about 500° C. as a consequence of the reaction of the fuel 23 and the atmospheric oxygen at the aforementioned air-to-fuel ratio of $\lambda>4$ during the flushing operation in the overrun mode, the catalytic converter 14 reaches temperatures of about 700° C., which lie below the usual operating temperatures of the catalytic converter 14 of about 900 to 1,000° C.

The invention claimed is:

1. A method for operating an internal combustion engine of a motor vehicle and that flushes the temporarily unused injection valves with fuel for the purpose of preventing or removing deposits wherein, the temporarily unused injection valves are flushed with fuel during an overrun mode of the internal combustion engine or the motor vehicle, the fuel which is delivered into the temporarily unused injection valves for the purpose of flushing is burned in a catalytic converter of an exhaust gas after treatment system of the internal combustion engine and a ratio between the quantity of fuel which is delivered per unit of time into the temporarily unused injection valves for the purpose of flushing and the quantity of overrun air, which flows through the internal combustion engine during the flushing operation, is adjusted in such a way that the result is an over-stoichiometric air-to-fuel ratio downstream of the internal combustion engine and upstream of the catalytic converter.

2. The method according to claim 1 wherein, during the overrun mode of the internal combustion engine of the motor vehicle, no additional fuel is delivered into the internal combustion engine except for the fuel that is used for flushing.

3. The method according to claim 1 wherein the quantity of fuel which is delivered into the temporarily unused injection valves for the purpose of flushing is sufficient to remove evaporated deposits.

4. The method according to claim 1 wherein the fuel in the catalytic converter reacts with the overrun air, which flows through the internal combustion engine during the flushing operation.

5. The method according to claim 1 wherein the ratio is adjusted in such a way that the result is an air-to-fuel ratio having a value of $\lambda>3$ downstream of the internal combustion engine.

6. The method according to claim 1 wherein the ratio is adjusted in such a way that the result is an air-to-fuel ratio having a value of $\lambda>4$ downstream of the internal combustion engine.

7. The method according to claim 1 wherein the adjustment is performed by a mutual adaptation of the overrun air supply and the fuel delivery rate during the flushing operation.

8. The method according to claim 1 wherein when a plurality of injection valves are flushed during an overrun mode, the air-to-fuel ratio is adjusted by a sequential, overlapping one another or simultaneous delivery of fuel to the injection valves to be flushed.

\* \* \* \* \*